(12) United States Patent
Kogen et al.

(10) Patent No.: US 8,498,898 B1
(45) Date of Patent: Jul. 30, 2013

(54) SYSTEM AND METHOD FOR POINT OF USE REWARD DETERMINATION

(75) Inventors: Mark F. Kogen, Lawndale, CA (US); Ramiro Munoz, Santa Monica, CA (US)

(73) Assignee: Citicorp Development Center, Inc., Blue Ash, OH (US)

( * ) Notice: Subject to any disclaimer, the term of this patent is extended or adjusted under 35 U.S.C. 154(b) by 0 days.

(21) Appl. No.: 09/526,876

(22) Filed: Mar. 16, 2000

Related U.S. Application Data

(60) Provisional application No. 60/125,353, filed on Mar. 19, 1999.

(51) Int. Cl.
*G06Q 30/00* (2012.01)
*G06Q 30/02* (2012.01)

(52) U.S. Cl.
USPC ... 705/14.3; 705/14.1; 705/14.17; 705/14.23; 705/14.28; 705/14.33; 705/14.38; 705/14.39

(58) Field of Classification Search
USPC ............... 705/1, 10, 14, 14.1, 14.17, 14.23, 705/14.28, 14.3, 14.33, 14.38, 14.39; 235/379, 235/380
See application file for complete search history.

(56) References Cited

U.S. PATENT DOCUMENTS

| | | | | |
|---|---|---|---|---|
| 4,650,981 A | 3/1987 | Foletta | | 235/449 |
| 4,795,898 A | 1/1989 | Bernstein et al. | | 235/487 |
| 4,977,501 A | 12/1990 | Lefevre | | 364/401 |
| 5,380,991 A * | 1/1995 | Valencia et al. | | 235/383 |
| 5,412,192 A | 5/1995 | Hoss | | 235/380 |
| 5,477,215 A | 12/1995 | Mandelbaum | | 340/825.34 |
| 5,484,997 A | 1/1996 | Haynes | | 235/492 |
| 5,594,233 A | 1/1997 | Kenneth et al. | | 235/492 |
| 5,687,322 A | 11/1997 | Deaton et al. | | 395/214 |
| 5,689,100 A | 11/1997 | Carrithers et al. | | 235/380 |
| 5,734,722 A | 3/1998 | Halpern | | 380/49 |
| 5,806,045 A | 9/1998 | Biorge et al. | | 705/14 |
| 5,884,271 A | 3/1999 | Pitroda | | |
| 5,956,694 A * | 9/1999 | Powell | | 705/14 |
| 6,105,002 A * | 8/2000 | Powell | | 705/14 |
| 6,698,661 B1 | 3/2004 | Cooreman et al. | | |
| 2002/0065712 A1 * | 5/2002 | Kawan | | |

FOREIGN PATENT DOCUMENTS

| | | |
|---|---|---|
| AU | 12267/97 | 7/1997 |
| AU | 12267/97 A | 7/1997 |
| EP | 933717 A | 8/1999 |
| FR | 2743021 | 7/1997 |

(Continued)

OTHER PUBLICATIONS

Schlumberger unveils e-cash enabled smart loyalty card from Newsbutes News Network dated Apr. 24, 1997.*

(Continued)

*Primary Examiner* — Raquel Alvarez
(74) *Attorney, Agent, or Firm* — Eric L. Sophir; Dentons US LLP

(57) ABSTRACT

A system and method that allows a group of organizations, e.g. a group of transit agencies, to provide their users with a stored value smart card payment method that rewards them for actual use. The system and method include a card interface device and a smart card for storing respective reward applications, wherein the card interface device reward application retrieves transaction and reward data from the smart card and processes the data within the card interface device in order to determine a transaction reward.

6 Claims, 7 Drawing Sheets

FOREIGN PATENT DOCUMENTS

| FR | 2762424 | | 10/1998 | |
|---|---|---|---|---|
| FR | 2769730 | | 4/1999 | |
| GB | 2 274 349 | | 1/1997 | |
| WO | WO 98/34458 | * | 8/1998 | ............... 705/14 X |
| WO | WO 98/47093 | * | 10/1998 | ............... 705/14 X |
| WO | WO 98/52159 A | | 11/1998 | |
| WO | WO 99/01960 | * | 1/1999 | ............... 705/14 X |
| WO | WO 99/13438 A | | 3/1999 | |

OTHER PUBLICATIONS

"uniLoyalty—Software Solution for Loyalty Scheme," site copyright of 1998, accessed Sep. 9, 1999, http://www.unicom.fi/uni_loyalty.html.

"Smart Cards Allow Supermarkets Loyalty Scheme to Target Individual Shoppers," Jun. 16, 1998, http://www.schlumberger.com/ir/news/sct-edah0698.html.

Lent, B., Derksen, E., "The Electronic Purse: A New and Economical Means of Payment for Public Transport," *Signal und Draht*, vol. 85, No. 5, pp. 143-147, May 1993.

Goto, K., Miki, S., "A New Railway Ticket System Using Contactless IC Cards," *Rail International*, vol. 25, No. 2, pp. 26-30, Feb. 1994.

O'Sullivan, O., "From France, A Glimpse of Things to Come [Electronic Purse]", *ABA Banking Journal*, vol. 89, No. 3, pp. 57-58, 60, 62, 69, Mar. 1997.

Rainio, M., "Smart Card Provides Ticket to Ride," *ID Systems European Edition*, vol. 5, No. 2, pp. 14, 16-17, Feb. 1997.

Cunningham, R. F., "Smart Card Applications in Integrated Transit Fare, Parking Fee and Automated Toll Payment Systems—The MAPS Concept," *Conference Proceedings, National Telesystems Conference 1993, Commercial Applications and Dual-Use Technology*, (Cat. No. 93CH3318-3), pp. 21-25, Published: New York, NY, USA, 1993.

Matukawa, K., Takesita, T., Aoyagi, H., Sezai, H., Tajima J., "Automatic Passenger Gate System Using Contactless IC Card," *Transactions of the Institute of Electrical Engineers of Japan*, Part C, vol. 115-C, No. 5, pp. 634-643, May 1995.

Mathieu, J. M., "Multi-Services/Multi-Providers Remote Ticketing on the Marseille Metropolitan Area," *Steps Forward, Proceedings of the Second World Congress on Intelligent Transport Systems '95 Yokohoma*, Pt. vol. 5, pp. 2221-2222, Published: Tokyo, Japan, 1995.

Attoh Okine, N.O., Shen, L.D., "Security Issues of Emerging Smart Cards Fare Collection Application in Mass Transit," *Pacific Rim TransTech Conference, 1995 Vehicle Navigation and Information Systems Conference Proceedings, 6th International VNIS, A Ride into the Future* (Cat. No. 95CH35776), pp. 523-526, Published: New York, NY, USA, 1995.

Quittner, Jeremy, "MasterCard to Pilot-Test Business Chip Card with Ticketless-Travel Feature," *American Banker*, vol. 162, No. 135, p. 17, Jul. 16, 1997.

Block, Valerie, "Lufthansa Using Smart Card that Eliminates Some Domestic Travelers' Need for Tickets," *American Banker*, vol. 161, No. 33, p. 12, Feb. 21, 1996.

"SmarTrip®. More than a smart card. It's Pure Genius", [online], Washington Metropolitan Area Transit Authority (WMATA), [retrieved on Dec. 12, 2002], Retrieved from Internet: www.wmata.com/riding/smartrip.cfm.

Australian Patent Office Search Report dated Oct. 10, 2001.

FR 2743021 published Jul. 4, 1997, Abstract only in English, downloaded from espacenet.com, 2 pages.

FR 2762424 published Oct. 23, 1998, Abstract Only in English, downloaded from espacenet.com, 1 page.

FR 2769730, published Apr. 16, 1999, Abstract Only in English, downloaded from espacenet.com, 1 page.

European Search Report dated Jul. 29, 2003 in related Application No. EP00200964 filed Mar. 17, 2000, 3 pages.

Australian Examiner's first Report dated Nov. 10, 2000 in related Application No. 22426/00, filed Mar. 17, 2000 2 pages.

Search Report, and Written Opinion dated Oct. 10, 2001 in related Application No. SG 200001484-5 filed Mar. 17, 2000, 8 pages.

* cited by examiner

SYSTEM AND METHOD FOR POINT OF USE REWARD DETERMINATION

CROSS-REFERENCE TO RELATED APPLICATIONS

The present application claims priority to, and incorporates herein, provisional patent application Ser. No. 60/125,353 filed Mar. 19, 1999.

BACKGROUND OF THE INVENTION

1. Field of the Invention

The present invention relates to a system and method for determining a reward, and more particularly, to a point-of-use reward determination system and method.

2. Description of the Related Art

Many providers of goods and services offer rewards to those with whom they interact. The rewards may take many forms, such as discounts off of the normal price of a good or service, free goods or services, or other special offers. These rewards are most prevalent in consumer-oriented industries, where the consumer has a multitude of choices among competing products and services. The entities within these industries utilize reward-type programs to attract, maintain and expand their consumer base. It is believed that the reward applications modify consumer behavior, resulting in increased consumer loyalty. For example, in the transportation realm, monthly passes can be purchased at a price lower than the cumulative price of paying for the service on a daily basis. Thus, reward applications are key components of many providers of goods and services.

There are a number of disadvantages, impacting both providers and consumers, in current implementations of these types of programs. From the stand-point of the provider, the management and operation of these programs can require a tremendous investment. Many reward programs utilize a central computer system to track and update the reward status of the consumers participating in the program. The centralized tracking is inherently inefficient, as it requires the plethora of transaction information related to the reward program, from numerous transaction sources associated with a multiplicity of consumers, to be routed to one location for sorting and tracking. The complexity of such a system is further increased by the checks and balances that must be implemented to audit and account for each step of the process flow. This requires a large investment in both capital goods and human resources.

Further, the traditional reward system requires the development and classification of various product categories that must be managed throughout the system. For example, in transportation services, pass products as rewards may be offered for daily, weekly, monthly and other specially-defined periods or for other type services, like transfers. As such, the variety of product categories requires consumers to search through and choose the most appropriate product category that the customer wishes to have associated with the current purchase. This can be especially cumbersome and frustrating when implementing product purchasing through self-service terminal devices.

Additionally, with regard to prepaying for a good or service, the provider is often required to implement special accounting rules in allocating and tracking the money associated with such goods or services. The provider may have to allocate the money to a special prepaid pool. Then, the provider may need to track actual usage of the good or service associated with that prepaid pool to reconcile the prepayment with the usage. This requires additional investment in time, manpower and equipment for the provider.

From the consumer aspect, many times the benefit of the reward is outweighed by the cost of obtaining the reward. In the case of the monthly pass discussed above, for example, the customer is required to commit an up-front investment in order to obtain the reward. Typically the up-front investment is substantially greater than the near-term cost of the product or service. For example, the METRO system in Washington D.C. costs at a minimum $1.15 per ride and a customer, if they choose, can purchase a METRO card for exactly $1.15. But, the METRO offers a reward of 10% for METRO card purchases in excess of $20 and $30, respectively. Consequently, although a customer may need only $1.15 in METRO fare for his/her immediate use, if the customer fronts in excess of $20 he/she will be rewarded with an additional $2.00 on the purchased METRO card. Obviously, this reward system requires the customer to forecast their expected usage in order to determine whether or not the up-front investment exceeds the cumulative total of the expected usage. Further, the up-front investment may discourage many consumers from participating in the program. Even though a consumer may have an expected usage that would justify the up-front investment, the consumer may not be able to afford such a large investment. Additionally, these types of rewards offer little incentive to infrequent users.

Finally, many conventional reward programs implement the reward application through the customer's device (e.g., smart card microprocessor). This is disadvantageous for a numerous reasons. It is cumbersome to try and update or alter the reward application due to the number of devices that need to be updated. Further, assuming that a customer does not update his/her reward application, he/she could miss out on possible rewards.

Thus, the current systems and methods for implementing typical reward programs are often inefficient from the perspective of both the provider and the consumer.

BRIEF SUMMARY OF THE INVENTION

Embodiments of the present invention include a system and method that allows a group of organizations, e.g. a group of transit agencies, to provide their users with a stored value smart card payment method that rewards them for actual use.

An embodiment of the present invention includes a system for processing a transaction. The system includes a card interface device having a first memory for storing software programs and a first processor for running software programs, wherein the software programs include at least one reward application program with at least one rules file, a payment application, and a transaction log file, the reward application program determining a transaction award and a smart card capable of communicating with the interface device, the smart card having a second memory for storing software programs and a second processor for running software programs, the second memory including a main software program having an electronic purse application integrated with a reward application, wherein the reward application includes at least one file utilizable by the card interface device to determine the transaction reward.

An embodiment of the present invention includes a method for performing a transaction including determining a transaction-based award and facilitating payment for the transaction. The method includes reading reward data from a smart card reward application on a smart card via a card interface device, entering the reward data into a reward application program on the card interface device, applying rules from a rules file within the reward application program to the reward data to determine the transaction-based award, calculating a transaction amount, reading payment data from a purse application on a smart card via a card interface device, entering the payment data into a payment application on the card interface device, processing the payment data to determine the availability and source of the transaction amount, deducting the transaction amount from the purse application, updating a purchase transaction log on the smart card, and updating a transaction log file on the card interface device.

DETAILED DESCRIPTION OF THE INVENTION

Figure 1:
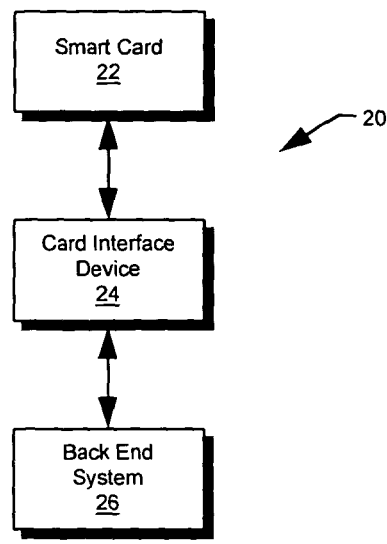
FIG. 1 is a schematic representation of one embodiment of a system according to the present invention.

According to one embodiment of the present invention, FIG. 1, is a point-of-use method and system 20 for rewards comprising a smart card 22 performing a transaction with a card interface device (CID) 24. CID 24 comprises hardware and software and/or firmware programming for determining at the time of the transaction whether or not the transaction qualifies for a reward. CID 24 makes the reward determination based on data read from smart card 22 using the software programming. A reward comprises either a discount applied to the current transaction, a credit for a future free transaction, access to a special offer, and any other similar type of benefit that accrues to the owner of smart card 22. CID 24 then determines the transaction amount, taking into account whether or not a reward applies and updates and debits smart card 22 for the applicable transaction amount. Further, CID 24 updates the reward application file and transaction log file on smart card 22, while maintaining its own transaction log file. CID 24 communicates with back end systems 26 to transfer the transaction log file data for settlement purposes.

Additionally, back end systems 26 may provide CID 24 with updated software programming to initiate changes or start new reward applications. For example, if no reward application file exists on the card for a program supported by CID 24, CID 24 will check to see if there is space to add additional files and adds the reward program file accordingly. Alternatively, CID 24 gives the owner a listing of the current reward programs so that a consumer can select to overwrite a reward program file they no longer use. CID 24 is capable and authorized to overwrite an existing reward program file in the card data file and add a new program to the card. Thus, system 20 of the present invention advantageously provides a point-of-use reward by maintaining the software programming for determining the reward within CID 24 while keeping the relevant data used in the reward determination on smart card 22.

All communications between the smart card 22, CID 24 and back end system 26 will be handled with appropriate security to ensure the integrity, validity and privacy of the information being moved. This technology will change over time as the sophistication of interlopers and their access to technology increase. As one skilled in the art as defined by todays security technology recognizes, all messages would be signed and all files MAC'ed. Additional security provisions are included to ensure that proper devices are used in critical dialogs such as updating program characteristics on the CID or in the case of the smart card, using techniques such as independent mutual authentication for those operations.

Figure 2:
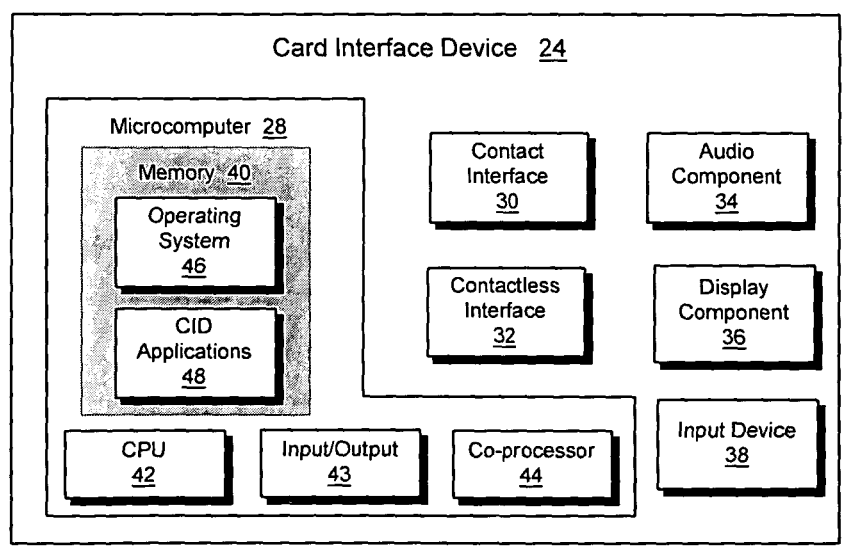
FIG. 2 is a schematic representation of one embodiment of a card interface device ("CID") according to the present invention.

Referring to FIG. 2, CID 24 comprises a terminal for housing microcomputer 28, contact interface 30 and contactless interface 32 for performing a point-of-use transaction. For example, CID 24 may comprise a terminal/gateway used to gain access to and/or exit from a service. Similarly, CID 24 may comprise or connect to a point-of-sale (POS) merchant terminal. Contact interface 30 or contactless interface 32 may be utilized to establish a communications channel with a corresponding interface on smart card 22. For example, contact interface 30 may comprise an interface meeting the specifications of International Standards Organization (ISO) standard number ISO-7816. Similarly, contactless interface 32 may comprise an interface meeting the specifications of ISO standard number ISO-14443.

Additionally, CID 24 further comprises audio component 34, such as a speaker, display component 36, such as a monitor, and input device 38, like a key pad or a touch-screen monitor when it is combined with display component 36 in one embodiment. Audio component 34 and display component 36 are used to provide feedback to those interacting with CID 24. Further, display component 36 and input device 38 allow an interactive transaction to be performed.

Microcomputer 28, in combination with contact interface 30 and contactless interface 32, comprises interface circuitry that advantageously provides CID 24 with an integrated contact and contactless functionality. Microcomputer 28 further comprises memory 40, a central processing unit (CPU) 42 that manages data and runs application programs, and a co-processor 44 that provides additional processing capability. For example, co-processor 42 may be a Triple-DES (Data Encryption Standard), a crypto-public key (PK) co-processor, and/or another similar encryption capable co-processor that provides security for communications utilizing both contact interface 30 and contactless interface 32. In one embodiment CID 24 interfaces with back end systems 26 via input/output (I/O) channel 43 managed by CPU 42. Also, memory 40 comprises standard memory units known in the art, such as memory units in the form of random-access memory (RAM), read-only memory (ROM) and electrically-erasable programmable read-only memory (EEPROM). Microcomputer 28 operates under firmware controlled by its internal read-only memory and formats data and interprets commands between contact interface 30 and contactless interface 32. A suitable microcomputer 28 having the above-mentioned capabilities is the MIFARE® PRO microprocessor manufactured by Philips Semiconductors. Similarly a dual interface chip is available from Siemens.

CPU 42 and memory 40 are capable of respectively processing and storing data and signals representative of algorithms, such as CID operating system 46 and software programs such as CID applications 48. CID operating system 46 and applications 48 may be utilized with either contact interface 30 or contactless interface 32. Operating system 46 may comprise standard operating systems or platforms, such as the Java® platform, or proprietary solutions.

Figure 3:
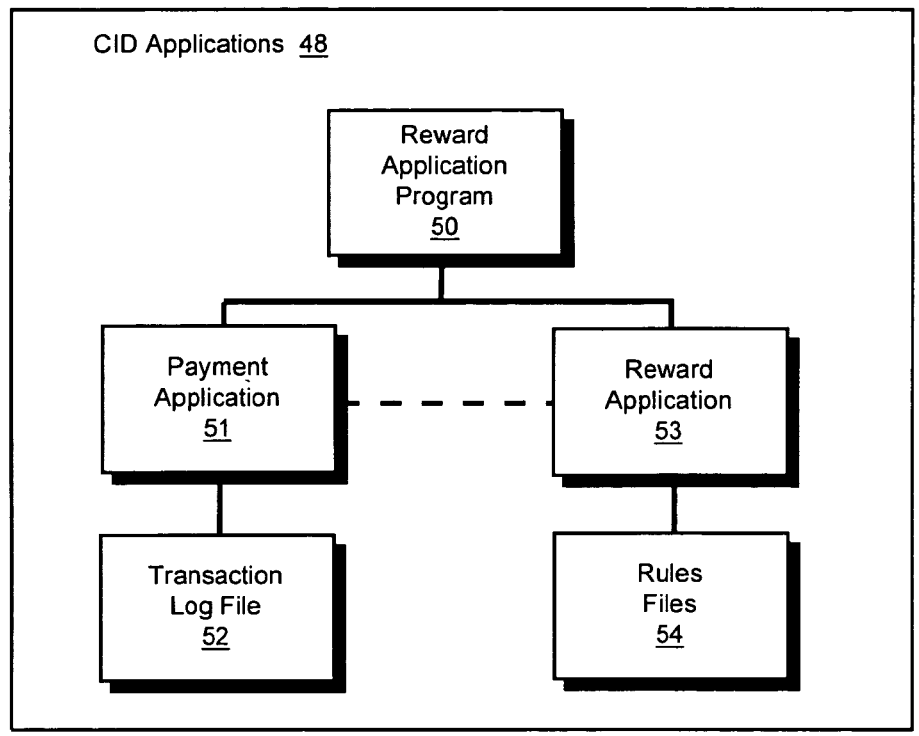
FIG. 3 is a schematic representation of the file structure of one embodiment of a CID application file according to the present invention.

Referring to FIG. 3, CID applications 48 comprise service/purchase transaction payment and reward application programs 50, such as payment application 51 and reward application 53, and its associated transaction log file 52 and rules file 54 used to run the payment and reward applications. Payment application 51 comprises methods and security associated with authenticating the payment application, such as an open or closed purse, on card 22 and processing for the collection of value for a transaction. Reward application 53 comprises methods and security associated with authenticating the reward application on card 22 and adding or subtracting reward value as appropriate for the transaction being processed. Payment application 51 and reward application 53 may pass information between each other (as denoted by the dashed line) in a controlled manner, such as under the management of reward application program 50 or operating system 46.

Further, reward application program 50 comprises the software that manages the selection and interaction of the application or service between smart card 22 and CID 24 in performing a reward, transaction amount, and/or payment determination. The service may comprise an application program that provides services and/or manages all of the other applications on a card, such as a security service or update service. The programming in rules file 54 for CID applications 48 is associated with provider a 56, who is the entity such as a merchant or operating authority that implements and controls the service/purchase and reward application. CID applications 48 may be set up such that there are multiple rules files 54, each corresponding to a different provider 56, and a single reward application 53 that interacts with each of the multiple rules files 54. Alternatively, CID applications 48 may be set up with a separate reward application 53 and rules file 54 for each provider 56. As such, a single CID 24 may comprise applications for: multiple providers 56 each having individual reward application 53 and rules files 54; multiple rules files and a single reward application for a single provider; and/or a single rules file and reward application for multiple providers. One embodiment of the single reward application program for multiple providers, for example, allows local merchants to compete with larger, national merchants.

Transaction log file 52 comprises a detailed data record of the specific information associated with each transaction performed between CID 24 and smart card 22. This detailed information includes the data typically utilized in the settlement process performed by back end system 26, such as card number, date, amount of transaction, etc. Further, transaction log file 52 may comprise additional information specific to reward application 53 and used in the reward and transaction amount determination process. TABLE 1 below is a schema according to an embodiment of the present invention for recording transaction payment information within the transaction log file 52. The CID will retain the electronic purse purchase transaction and append to it as discretionary data the information to be tracked for statistical analysis. For example the following data would be appended to a purchase record in the purchase batch maintained on the CID.

TABLE 1

| | |
|---|---|
| Card Number | Uniquely identifies the card |
| Merchant Transit Agency ID | The merchant/transit agency for which this loyalty record applies. Could be an identifier for a group of merchants/transit agencies. Same as the Loyalty program ID. |
| Txn ID | Unique ID for this transaction posted on this loyalty record. Could contain authentication mechanisms to prevent tampering. |
| Terminal ID | Uniquely identifies the device, hence the merchant, that performed this transaction on this loyalty record. |
| Txn Date | The date of this transaction |
| Price or Fare $ charged | Actual amount deducted from the card. |
| Txn Time | The time stamp for the transaction. |
| $ Discount Granted | Discount from the normal fare that would have been applicable to this route, card, time of day had not discounts applied. |
| Basis For Discount | Code that indicates the reason for granting the discount. Could be because of $ volume reached, or number of transactions reached. Further it would indicate over what period (day, week, month, year). |
| Level Reached | The level reached ($ or #) that entitled the card to a discount. |

Similar to the schema of TABLE 1, the transaction log file 52 of the CID 24 also contains a database that includes data and logic necessary to perform reward calculations (e.g., discount calculations). TABLE 2 sets forth a schema for storing and tracking rewards calculation data.

TABLE 2

| | |
|---|---|
| Loyalty Program ID | The loyalty program applicable to the card data |
| Merchant/Transit Agency ID | The merchant/transit agency for which this loyalty record applies. Could be an identifier for a group of merchants or transit agencies. |
| Terminal ID | Uniquely identifies the device, hence the merchant, that performed the last transaction on this loyalty record |
| Txn $ | The $ amount to charge for a non discounted transaction. This will be actually several registers since different types of card, etc, incur different transaction charges. |
| Txn Date | Today's Date |
| # Txns this week | The number of transactions that the card needs to achieve with this group of merchants this week to qualify for a discount. |
| # Txns this month | The number of times that the card needs to be used |

TABLE 2-continued

| | with this group of merchants this month to qualify for the discount. |
|---|---|
| # of Txns this year | The number of times that the card needs to be used with this group of merchants this year to qualify for the discount.. |
| TOT $ this week | Total $ amount spent on this merchant or group of merchants this week or even this day to qualify for a discount. |
| TOT $ this month | Total $ amount spent on this merchant or group of merchants this month to qualify for a discount. |
| TOT $ this year | Total $ amount spent on this merchant or group of merchants this year to qualify for a discount. |
| $ Discount for # Txns this week | The actual discount (or applicable fare) if the card qualifies for a discount based on the # of transaction this week. |
| $ Discount for # Txns this month | The actual discount (or applicable fare) if the card qualifies for a discount based on the # of transaction this month. |
| $ Discount for # of Txns this year | The actual discount (or applicable fare) if the card qualifies for a discount based on the # of transaction this year. |
| $ Discount for TOT $ this week | The actual discount (or applicable fare) if the card qualifies for a discount based on the $ of transaction this week. |
| $ Discount for TOT $ this month | The actual discount (or applicable fare) if the card qualifies for a discount based on the $ of transaction this month. |
| $ Discount For TOT $ this year | The actual discount (or applicable fare) if the card qualifies for a discount based on the $ of transaction this year. |

TABLE 2 is one embodiment of a schema for tracking reward data according to the present invention. One skilled in the art recognizes that different data structures may be used for different types of programs. A database according to the schema of TABLE 2 is kept for each merchant/transit agency ID that participates. As each of the CID applications 48 may comprise proprietary solutions, the type of additional information stored according to any number of different schema is limitless. Further, as mentioned above, the information contained in transaction log file 52 is typically batched, or gathered together in some manner, and transferred to back end systems 26 for data collection and processing purposes.

Rules file 54 comprises the rules used by reward application 53, which is the software engine that evaluates the applicability of a reward. Depending on the sophistication of the program and the associated hardware, rules file 54 comprises: linear programming; table-driven, relational programming, such as with a relational database; and heuristic rules, such as by utilizing fuzzy logic or artificial intelligence. Back end system 26 supplies CID 24 with an updated rules file 54 when the parameters associated with reward application 53 change. For example, when a reward is increased, decreased, or eliminated, then rules file 54 is updated. A number of methods may be utilized for updating rules file 54, as is discussed in more detail below in reference to alternate system embodiments. Also, rules file 54 comprises rules based on time, transaction amount, transaction number, etc. that are utilized to selectively implement the rules so that less frequent updates from back end system 26 are required. Additionally, CID 24 is capable of turning on or off the use of rules file 54. The turning on and off of rules file 54 may be advantageously utilized for: the temporary suspension of a program; disabling one program if multiple programs are active on CID 24; and for retaining multiple files such that a new set of rules may be verified, and if a problem is encountered, permitting fallback to an earlier version of the rules.

Figure 4:
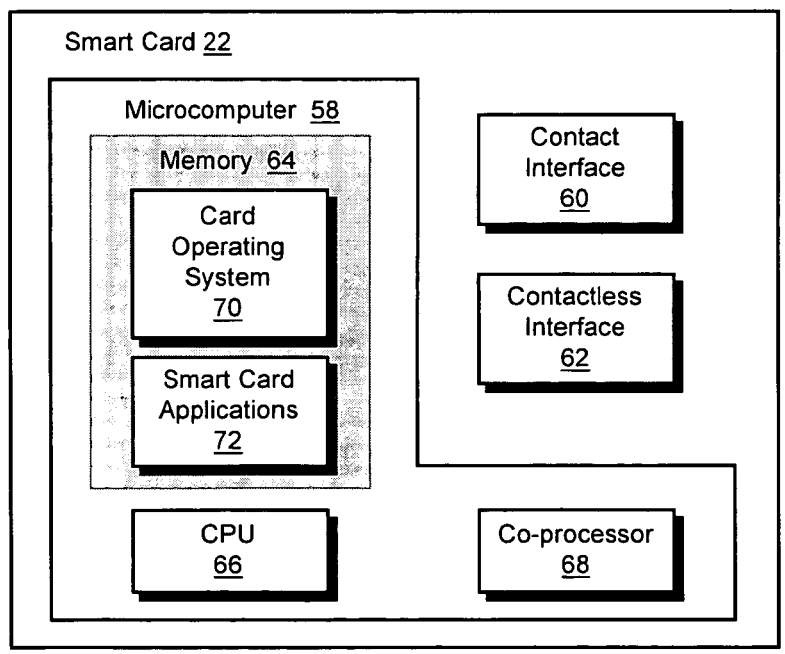
FIG. 4 is a schematic representation of one embodiment of a smart card according to the present invention.

Referring to FIG. 4, smart card 22 comprises a plastic, credit-card-sized card with an imbedded microcomputer 58, contact interface 60 and contactless interface 62 used in performing a financial transaction. Microcomputer 58, in combination with contact interface 60 and contactless interface 62, comprise interface circuitry that advantageously provide smart card 22 with an integrated contact and contactless functionality. Microcomputer 58 further comprises memory 64 for storing data and programs, a central processing unit (CPU) 66 that manages data and runs application programs, and a co-processor 68 that provides additional processing capability. Microcomputer 58 is basically similar to microcomputer 28 discussed above in reference to CID 24, although microcomputer 58 is programmed for smart card 22.

CPU 66 and memory 64 are capable of respectively processing and storing data and signals representative of algorithms, such as card operating system 70 and software programs such as smart card applications 72. Card operating system 70 and applications 72 may be utilized with either contact interface 60 or contactless interface 62. Card operating system/platform 70 includes proprietary solutions or standard solutions, such as the Java® platform or the Multos® operating system.

Figure 5:
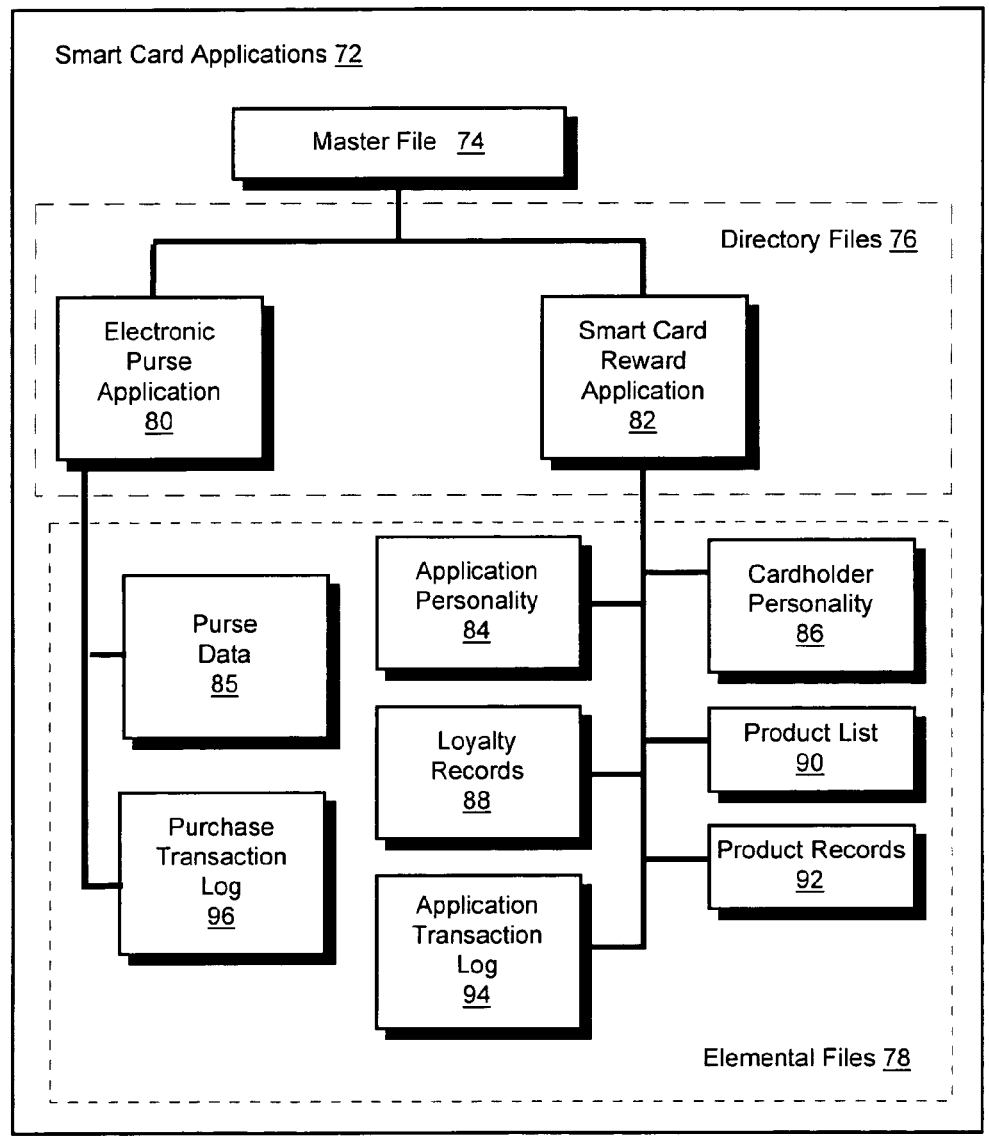
FIG. 5 is a schematic representation of the file structure of one embodiment of a smart card applications file according to the present invention.

Referring to FIG. 5, smart card application 72 comprises a master file 74 for managing and organizing one or more directory files 76. Each directory file 76 comprises a separate application program within memory 64 of smart card 22. Each directory file 76 comprises data and information for managing, organizing and controlling the application, such as application identification information and an application directory. Associated with each directory file 76 is at least one elemental file 78. Elemental file 78 holds the data and information that is utilized by and generated from the application program.

For example, in one embodiment of the present invention, directory files 76 may comprise electronic purse application 80 and smart card reward application 82. Electronic purse application 80 may comprise a program enabling the use of electronic value in a smart card transaction. Electronic purse application 80 uses multiple elemental files to store state and configuration data, such as purse data 85, and load and purchase transaction logs, such as purchase transaction log 96. One suitable electronic purse application 80 is VISA CASH, for example. Smart card reward application 82 may comprise a loyalty program that provides discounts or other benefits based on transactions performed with provider 56 supporting the reward application. Under smart card reward application 82, elemental files 78 may comprise application personality 84, cardholder personality 86, loyalty records 88, product list 90, a plurality of product records 92 and application transaction log 94, for example.

Application personality 84 comprises data particular to each application, such as pointers to authentication key sets and the application name, revision number, and dates of operation or expiration, for example. Cardholder personality 86 comprises profile data associated with the cardholder, such as: name, identification number, senior citizen, disabled, youth, student, age, level in school, and other potential classifications which might be used to determine eligibility for certain types of discounts. The use of this record is program specific. Also, the present invention advantageously allows each provider 56 to independently define the definition of what is included in each of these classes.

Loyalty records 88 may comprise at least one, and preferably a plurality of, records specific to each provider 56 participating in the reward application. Each loyalty record 88 is preferably a free-form data record that may be individually defined by each provider 56. To organize each loyalty record 88, the first byte of data in each loyalty record may be an index number associated with a particular provider 56, which also correlates to a position in the file for the particular provider's record. In an alternative embodiment, each loyalty record 88 additionally comprises data relevant to the product offering of the particular provider 56, as well as authentication information that may be required. In performing a transaction, CID 24 searches for the index number associated with the particular provider 56 that operates the CID 24. Advantageously, CID 24 is the only device that needs to know the free-form data structure within the record. Similar to the schema shown in TABLE(s) 1 and 2, TABLE 3 is an example of a schema for structuring data within the card's loyalty record 88 according to an embodiment of the present invention.

TABLE 3

| | |
|---|---|
| Loyalty Program ID | Identifies the merchant/transit agency for which this loyalty record applies |
| Transaction ID | Unique ID for the last transaction posted on this loyalty record. Could contain authentication mechanisms to prevent tampering. |
| Terminal ID | Uniquely identifies the device, hence the merchant, that performed the last transaction on this loyalty record. |
| Txn $ | The $ amount for the last transaction posted on this record. |
| Txn Date | The date the last transaction was posted on this record. |
| # Txns this week | The number of times that this card has been used with this group of merchants this week. |
| # Txns this month | The number of times that this card has been used with this group of merchants this month. |
| # of Txns this year | The number of times that this card has been used with this group of merchants this year. |
| TOT $ this week | Total $ amount spent on this merchant or group of merchants this week or even this day. |
| TOT $ this month | Total $ amount spent on this merchant or group of merchants this month. |
| TOT $ this year | Total $ amount spent on this merchant or group of merchants this year. |

Product list 90 is a file comprising a list of unique products or services offered in association with reward application 82. Product list 90 is used to index into product records 92. Product records 92 are files comprising definitions of individual product characteristics and the associated detailed information about each product associated with reward application 82. For example, product records 92 integrate reward application 82 by offering tokens, prepaid passes, etc. As one skilled in the art will realize, product list 90 and product records 92 may vary by reward application 82 and by industry. Additionally, product list 90 and product records 92 files comprise pointers to and a data manager interactive with electronic purse application 80. This enables a transaction to be performed to fully take advantage of all of the applications within card 22. For example, using a transit application, when a consumer goes to add value to a transit application, product list 90 and product record 92 note the type of product purchased by the consumer, such as a prepaid pass, and keep a record of this information. When the consumer uses the transit application in a transaction, card 22 interacts with CID 24 to let it know what transit applications are loaded on the card. Within card applications 72, CID 24 recognizes the transit application and the closed purse value, such as the prepaid pass, stored within that application, as identified by the product list and the product record. CID 24 then analyzes the other related applications to determine if other discounts may apply. CID 24 then executes the transaction and updates the application transaction log and loyalty records on the card. Alternatively, if CID 24 finds no closed purse value, then it looks to purse application 80, in conjunction with analyzing reward application 82 and its associated applications to determine the most appropriate transaction amount. CID 24 then executes the transaction and updates the application transaction log, the purse transaction log and the loyalty records on the card. A further example of such interaction between open and closed purse systems may be found in U.S. patent application Ser. No. 09/500,163 entitled "System, Method And Apparatus For Value Exchange Utilizing Value-Storing Applications" and Ser. No. 09/276,823 similarly titled "System, Method And Apparatus For Value Exchange Utilizing Value-Storing Applications," and assigned to the present assignee. Thus, the system advantageously is flexible enough to utilize prepaid products or the open purse application and loyalty records to complete the transaction.

Application transaction log 94 comprises a record of data relevant to reward application 82 for the most recent transactions. This data may comprise information similar to the transaction information held in purse transaction log 96, such as transaction date, time, amount, merchant identification and other data relevant to performing settlement of the transaction. Additionally, application transaction log 94 may comprise data relevant to reward application 82. Typically, application transaction log 94 comprises a circular buffer holding the most recent n transactions, where n may comprise capacity for a minimum of about 10 transactions and a maximum limited only by the available memory allocated to this record. Further, application transaction log 94 has capacity for a minimum number of transactions so that the information from those transactions may be utilized by CID 24 in reward determinations associated with shared offerings. Shared offerings are transactions with one provider that may be recognized by the reward application 53 of another provider. Similarly, in the transit realm, a shared offering may be a transfer pass from one operator (i.e. bus) to another operator (i.e. train). Thus, application transaction log 94 provides flexibility for smart card reward application 82.

Figure 6:
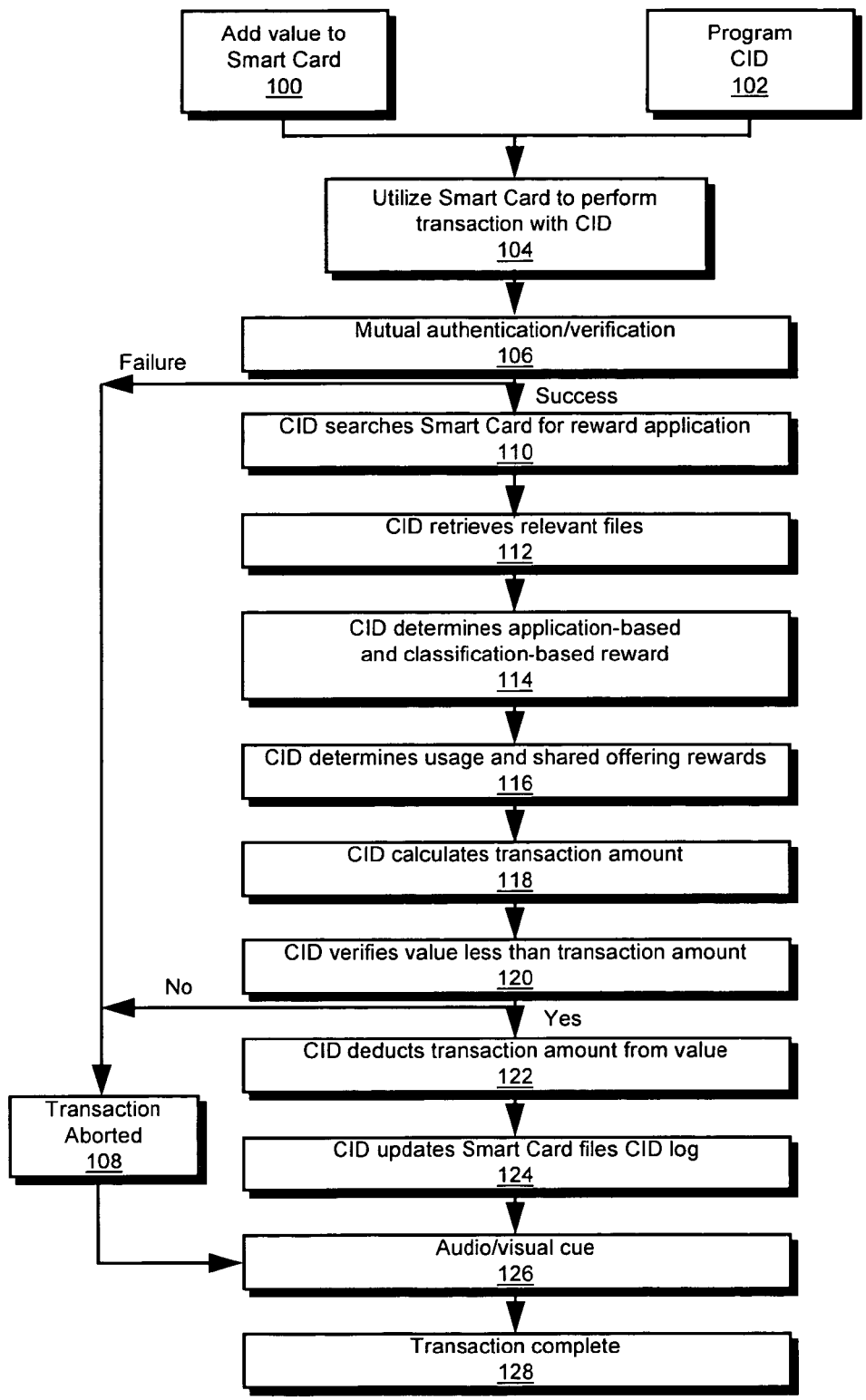
FIG. 6 is a flow chart representing one embodiment of the process flow according to the present invention.

In operation, referring to FIG. 6, a load device adds value to purse application 80 on smart card 22 in exchange for funds from a funding source, such as cash or debit, credit, checking and savings account numbers (Block 100). Also, CID 24 is loaded with reward application program 50 (Block 102) for provider 56. Smart card 22 is utilized to perform a transaction with CID 24 (Block 104). CID 24 and smart card 22 mutually interrogate and authenticate each other (Block 106). If the authentication process fails, then the transaction is aborted (Block 108). If the authentication succeeds, then CID 24 searches smart card applications 72 for reward application 82 associated with provider 56 that loaded reward application program 50 onto the CID (Block 110). There may be just one reward application 82 that is compatible with multiple providers 56, or there may be a plurality of reward applications 82 where each reward application is specific to one, or a specified group of, providers. CID 24 retrieves the relevant files from reward application 82 (Block 112). The relevant files preferably comprise application personality 84, cardholder personality 86, loyalty records 88 and application transaction log 94. Reward application program 50, running reward application 53 in combination with rules file 54 on CID 24 utilizes application personality 84 and cardholder personality 86 to determine whether or not an application-based and/or classification-based reward or discount applies to the current transaction (Block 114). Then, reward application 53 in combination with rules file 54 on CID 24 utilizes data in loyalty records 88 and application transaction log 94 to determine if a reward based on usage or a reward based on a shared offering has been earned (Block 116).

For example, loyalty records 88 comprise free form data that includes information relevant to the particular program offered by provider 56. Examples of typical free form data comprises usage history data, such as number of transactions, value of transactions, and other similar data (see TABLE 3). And, since loyalty record 88 is free form, the structure of the data may vary for each provider 56, and only the CID associated with that provider needs to know the format.

Reward application 53 and rules file 54 then calculate the transaction amount taking into account any reward that may have been earned (Block 118). CID 24 then searches purse application 80 to determine if enough value exists on smart card 22 to pay for the good or service (Block 120). If so, then CID 24 deducts the transaction amount from the amount of stored value on smart card 22 (Block 122). CID 24 then sends messages to smart card 22 so that application transaction log 94, loyalty record 88 and purse transaction log 96 may be appropriately updated. Also, CID 24 updates its own transaction log file 52 (Block 124). If time- or value-based parameters have exceeded their thresholds, then CID 24 resets these fields when the records are updated. If there was not enough value on smart card 22 to cover the transaction amount, then the transaction is aborted (Block 108). Alternatively, other functions may be implemented, such as an auto-load of value to enable the performance of the transaction. An example of such functionality is disclosed in U.S. patent application Ser. No. 09/500,163 entitled "System, Method And Apparatus For Value Exchange Utilizing Value-Storing Applications" and Ser. No. 09/276,823 similarly titled "System, Method And Apparatus For Value Exchange Utilizing Value-Storing Applications," assigned to the present assignee. Finally, an audio or visual cue is given to represent the status of the transaction (Block 126), and the transaction is completed (Block 128).

System 20 (FIG. 1) is only one example of numerous system embodiments of the present invention. As described above, system 20 may comprise CID 24 that is remote from, or on-line with, back end systems 26. An advantage of the embodiments of the present invention is that any updates or changes to the merchant/transit reward systems need only be made to the CIDs 24, not the smart cards 22. Either a central system or distributed servers at merchant/transit operator locations support a process of rules generation and management. The merchant/transit operator then has control over the rules by which discount fares are calculated. This in conjunction with e.g., a fare table, in the case of a transit implementation and product pricing or purchase subtotal in the case of a merchant is used to determine the actual funds to be collected for a transaction. The merchant/transit operator defines the rules. The rules are placed in a file in for example, a distribution server or the like and at the appropriate time, the file is accessed and the rules are distributed to the CIDs. These rule updates/changes are then in force until they are replaced or the device is sent a message to disable the rules. The rules data is capable of distribution from the server to a CID through a number of mechanisms including but not limited to a network connection, a portable collection/update device, and a portable data storage media.

Figure 7:
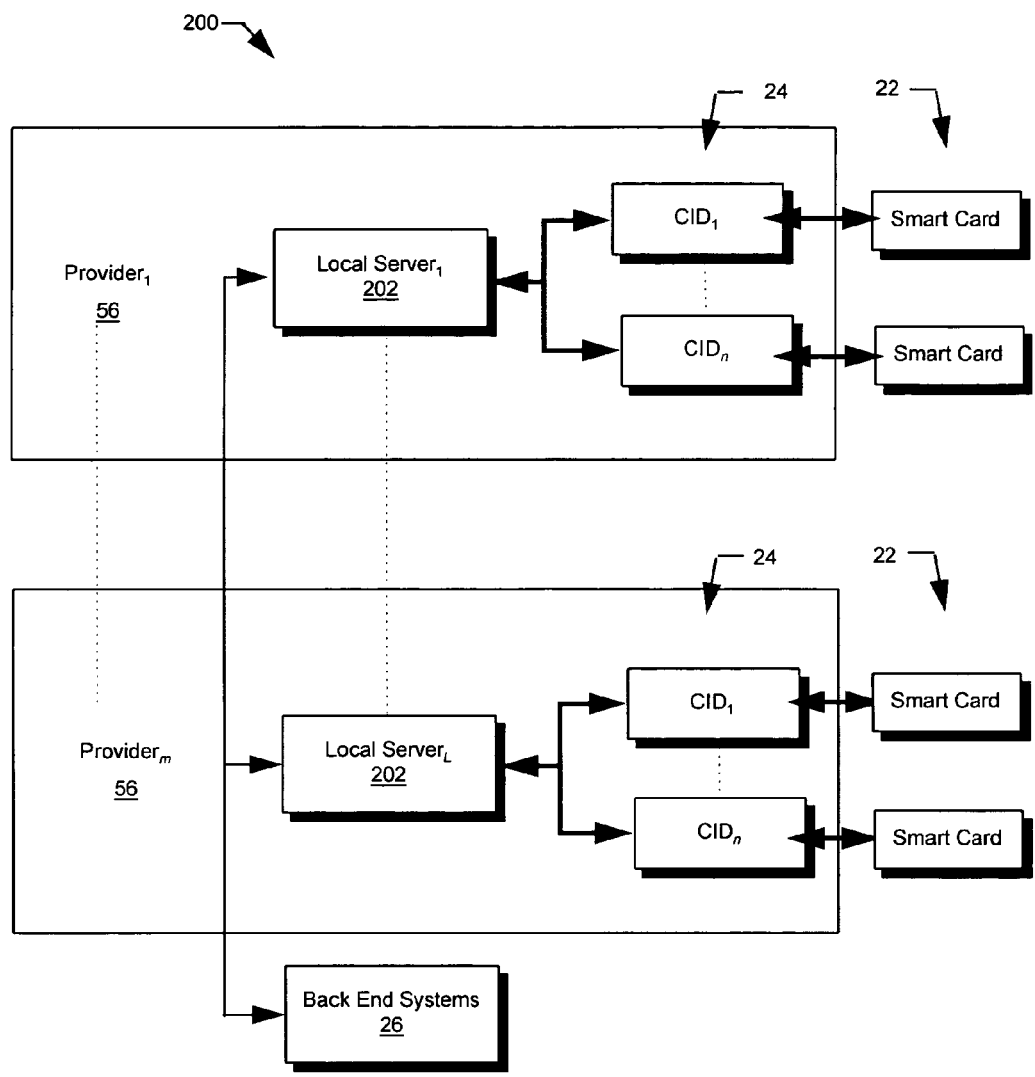
FIG. 7 is a schematic representation of local system embodiment according to the present invention.

Referring to FIG. 7, system 200 comprises a local system where each provider 56 locally controls his/her own reward application. Smart cards 22 interact locally with one or more CIDs 24 at the provider location. All of the CIDs 24 at that location are in communication, either directly or remotely, with local server 202. Local server 202 may collect the local batching of transactions and updating of each CID 24 with rules files. Each local server 202 is in turn in communication with back end systems 26 for settlement purposes. System 200 may be implemented in a merchant location, like a grocery store with multiple merchant terminals, where each CID 24 is associated with a merchant terminal. There may be 1 to n number of CIDs 24 at each provider location, and there may be 1 to m number of providers 56 and 1 to L local servers 202 specifically controlled by each provider. Thus, in a system such as system 200, each provider 56 individually controls and updates local server 202 and CIDs 24.

Figure 8:
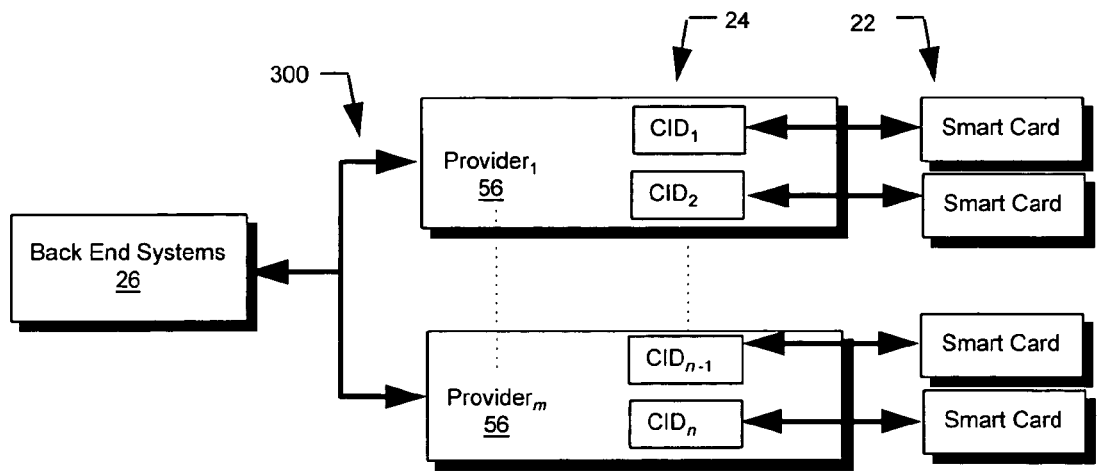
FIG. 8 is a schematic representation of broad system embodiment according to the present invention.

Further, referring to FIG. 8, a broad network system 300 comprise a plurality of CIDs 24 associated with a single provider 56, and/or a plurality of single providers, where back end systems 26 are used to manage and control all of the CIDs at each provider. Again, the connection to back end systems 26 may be direct or remote. There may be 1 to n number of CIDs 24, with at least one at each provider 56, where there may be 1 to m number of providers. Broad network system 300 may include geographically distributed providers 56 run by the same entity, or system 300 may include groups of providers who choose to associate with one another.

Figure 9:
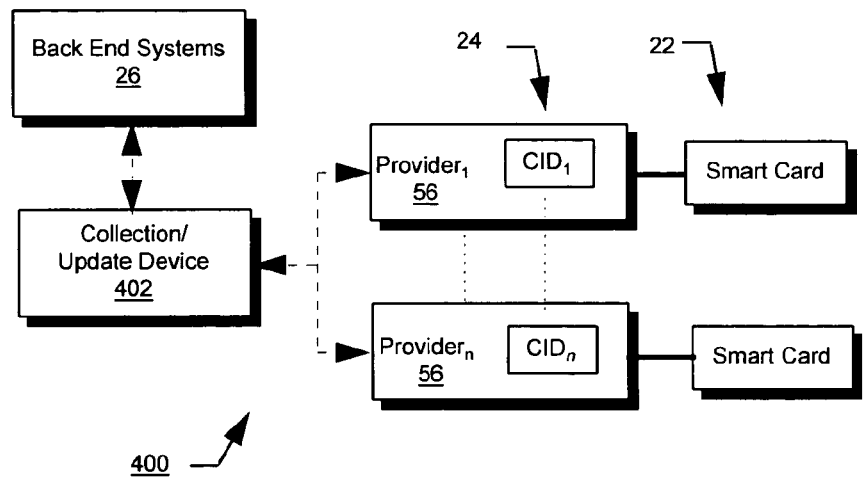
FIG. 9 is a schematic representation of a remote system embodiment according to the present invention.

Referring to FIG. 9, one embodiment of a remote system 400 comprises a plurality of providers 56, each having at least one CID 24, where a portable collection/update device 402 is utilized to manage the CIDs. Collection/update device 402 may be transported to each CID 24 for manually collecting the batch transaction log information and manually downloading updated rules files or other reward program applications. Collection/update device 402 is then brought in communication with back end systems 26 to perform settlement and to receive any new information updates. A suitable example of a collection/update device 402 comprises a special purpose hand-held computer or a portable PC with customized software on the unit. Collection/update device 402 is capable of interfacing with CID 24 to upload batches and download program, data and batch authentication notices to the CID. Further, collection/update device 402 has a second interface capable of communicating with back end systems 26, such as to deliver the batches and to receive downloads of information needed to be distributed to CID 24 with which it communicates.

Figure 10:
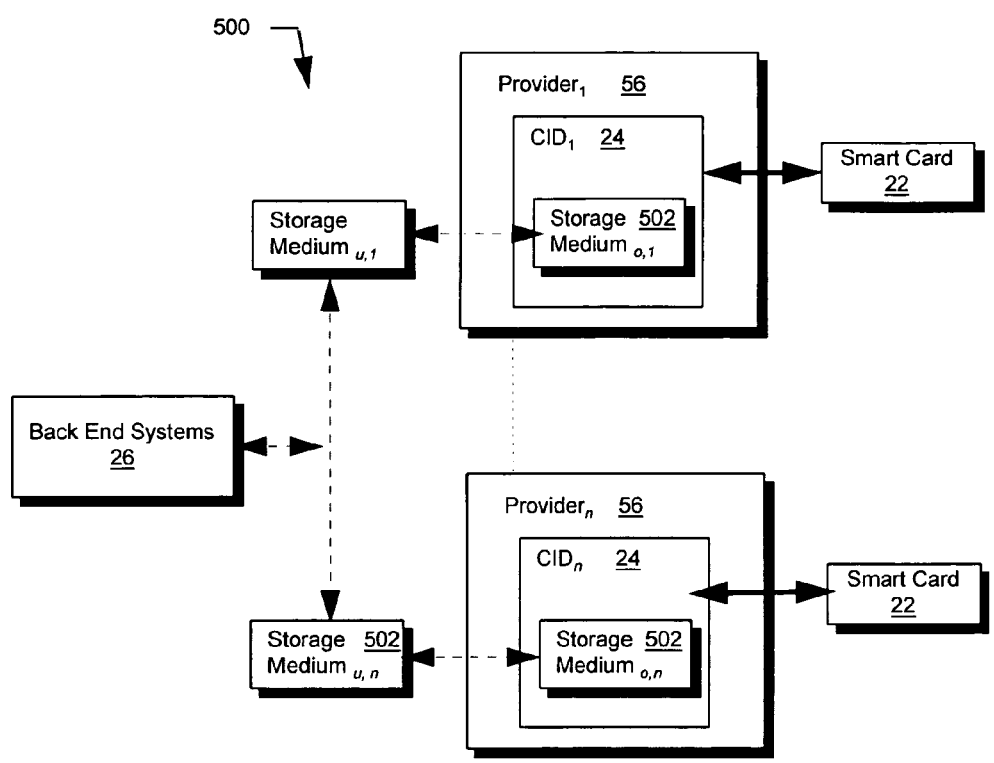
FIG. 10 is a schematic representation of another remote system embodiment according to the present invention.

Another embodiment of a remote system, referring to FIG. 10, comprises system 500 comprising storage medium 502 that may be interchanged between each CID 24 and back end systems 26. Storage medium 502 may comprise memory modules or disks that are swapped to exchange collected and updated data. For example, each CID 24 may initially be installed with an original version "o" of storage medium 502, where there are 1 to n number of copies of the storage medium, matching the 1 to n number of CIDs, so that each CID receives a copy. At an interval determined by provider 56 or the entity controlling system 500, updated version "u" of storage medium 502 generated by back end systems 26 is used to replace the original version "o" of the storage medium in each CID 24. The original version "o" of storage medium 502 is returned to back end systems 26 for settlement purposes, while the updated version "u" installed in each CID may comprise new reward applications.

In updating the CID 24 and in order to ensure maximum flexibility of the reward application 53, the storage of information in the card 22 will vary depending on different implementations. Therefore requests and responses for the reward data is structured using self-defining data types. The CID 24 receives a data definition for each program it must respond to as part of the rules definitions that are delivered to it from a backend server 26. By providing this in this manner, the dynamics of any reward application 53 are specified at the time of download. In this case, each CID 24 needs to retain only the information associated with the operator/merchant reward applications that the CID specifically supports. This is important as it reduces the amount of storage space any CID 24 must allocate for that information and may improve operational performance, as searches through non-supported offerings are not required. The following is but one example of a possible structure for the data definition within the message.

TABLE 4

Message header
    Contains identifying information
    Message length (e.g. bytes)
Message body
    Field delimiter
        Length of field 1 (e.g. bytes)
        Type of field 1 (e.g. date, amount, number, etc)
        Content of field 1
    Field delimiter
        Length of field 2 (e.g. bytes)
        Type of field 2 (e.g. date, amount, number, etc)
        Content of field 2
End of Message In this way the CID has all the information it needs to interpret the loyalty record 88 on the card 22 and operate on it.

Although the invention has been described with reference to these preferred embodiments, other embodiments can achieve the same results. Variations and modifications of the present invention will be apparent to one skilled in the art, and the above description and the enclosed attachments are intended to cover all such modifications and equivalents.

The invention claimed is:

1. A system for processing a transaction, comprising:
a card interface device having a first memory for storing software programs and a first processor for running software programs, wherein the software programs include:
i. at least a first reward application program associated with a first merchant including at least one rules file, a payment application, and a transaction log file, the at least a first reward application program determining a first transaction award, and the first reward application program containing parameters comprising at least discount codes of the first merchant used by the first reward application program on the card interface device in at least an initial determination of the first transaction award; and
ii. at least a second reward application program associated with a second merchant including at least one rules file, a payment application, and a transaction log file, the at least a second reward application program determining a second transaction award, and the second reward application program containing parameters comprising at least discount codes of the second merchant used by the second reward application program on the card interface device in at least an initial determination of the second transaction award; and
a smart card capable of communicating with the card interface device, the smart card having a second memory for storing software programs and a second processor for running software programs,
the second memory including a main software program having an electronic purse application integrated with a reward application,
wherein the reward application includes at least one transaction file utilizable by the card interface device to select the first and/or second transaction award to be applied as a discount to a current transaction based at least in part on criteria of the current transaction,
the electronic purse application comprising a program for storing data representing value received in exchange for funds from a funding source that is available for use in transactions with the first and second merchants,
wherein the card interface device executes a transaction using the electronic purse application when the card interface device does not locate on the smart card a closed purse value for the reward application, and
wherein each merchant has a loyalty record in the transaction file having a free-form data structure, whereby the free-form data structure has a variable organization of data within the loyalty record for each merchant, and the card interface device is programmed to know a particular organization of data in the data structure for only those merchants associated with the card interface device.

2. The system according to claim 1, wherein the at least one rules files contain rules for determining the first and second transaction award according to at least one of the following programming methods linear programming, table-driven programming, and heuristic programming.

3. The system according to claim 1, further comprising a back-end device capable of collecting transaction data from the card interface device.

4. The system according to claim 3, wherein the back-end device is further capable of updating the at least a first and a second reward application program on the card interface device.

5. The system according to claim 3, wherein the back-end device is a server connected to the card interface device through a network.

6. The system according to claim 1, wherein the at least one transaction file is selected from the group consisting of a personality file and an application transaction log.

* * * * *